United States Patent
Chee et al.

(10) Patent No.: US 12,094,089 B2
(45) Date of Patent: Sep. 17, 2024

(54) INTELLIGENT VIDEO ENHANCEMENT SYSTEM

(71) Applicant: Black Sesame Technologies Inc., San Jose, CA (US)

(72) Inventors: Evelyn Chee, Singapore (SG); Shanlan Shen, Singapore (SG); Yubo Duan, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 425 days.

(21) Appl. No.: 17/474,736

(22) Filed: Sep. 14, 2021

(65) Prior Publication Data

US 2023/0081916 A1 Mar. 16, 2023

(51) Int. Cl.
*G06T 5/70* (2024.01)
*G06T 3/4053* (2024.01)
*G06T 5/92* (2024.01)

(52) U.S. Cl.
CPC .............. *G06T 5/70* (2024.01); *G06T 3/4053* (2013.01); *G06T 5/92* (2024.01); *G06T 2207/10016* (2013.01); *G06T 2207/20208* (2013.01)

(58) Field of Classification Search
CPC .......... G06T 5/70; G06T 3/4053; G06T 5/92; G06T 2207/10016; G06T 2207/20208; G06T 2207/20084
USPC ....................................................... 382/275
See application file for complete search history.

(56) References Cited

U.S. PATENT DOCUMENTS

| | | | |
|---|---|---|---|
| 7,262,818 B2 | 8/2007 | Chuang et al. | |
| 7,548,659 B2 | 6/2009 | Ofek et al. | |
| 7,746,382 B2 | 6/2010 | Soupliotis et al. | |
| 8,269,886 B2 | 9/2012 | Balram et al. | |
| 10,523,955 B2 | 12/2019 | Wang et al. | |
| 2021/0097288 A1* | 4/2021 | Fan | G06F 16/7844 |
| 2021/0160571 A1* | 5/2021 | Menendez | G06F 18/2413 |
| 2021/0281918 A1* | 9/2021 | Su | G06V 20/41 |
| 2021/0312318 A1* | 10/2021 | Ambrozic | G06N 3/088 |
| 2022/0159086 A1* | 5/2022 | Kumar | H04L 67/54 |
| 2022/0398402 A1* | 12/2022 | Jin | G06V 20/46 |
| 2023/0024037 A1* | 1/2023 | Zhou | G06N 3/063 |

FOREIGN PATENT DOCUMENTS

| | | | |
|---|---|---|---|
| WO | 2008011502 | 1/2008 | |
| WO | 2012068008 | 5/2012 | |
| WO | WO-2021108707 A1 * | 6/2021 | ......... G06K 9/00744 |

* cited by examiner

*Primary Examiner* — Michael Robert Cammarata
*Assistant Examiner* — Pardis Sohraby
(74) *Attorney, Agent, or Firm* — Timothy T. Wang; Ni, Wang & Massand, PLLC

(57) ABSTRACT

The present invention provides an intelligent and a flexible video enhancement system with improved visual quality of the video for better user experience. The video enhancement system enhances various types of videos and provides a user with better visual experience based on video corresponding features and personal preferences. The video enhancement system includes a dynamic analysis and adaptive processing techniques for enhancing video quality for seamless user experience.

14 Claims, 6 Drawing Sheets

INTELLIGENT VIDEO ENHANCEMENT SYSTEM

FIELD OF INVENTION

The present invention relates to a system and method for enhancing a video. More specifically, an intelligent video enhancement system that aims to improve visual quality of the video for seamless experience by analysing and processing the video collectively based on preferences of a user.

BACKGROUND OF THE INVENTION

Video enhancement is a systematic task, which aims to improve visual quality for better user experience. The aim of video enhancement is to improve the visual appearance of the video, or to provide a better transformation representation for future automated video processing, such as analysis, detection, segmentation, recognition, surveillance, traffic, etc.

The video enhancement techniques also helps analyses background information that is essential to understand object behaviour without requiring expensive human visual inspection. There are numerous applications where digital video is acquired, processed and used, such as surveillance, general identity verification, traffic, criminal justice systems, civilian or military video processing.

In recent years, there is a strong demand for high performance and immersive experiences in visual systems like mobile platform, television, social media, IoT, etc. To fulfil consumer's eagerness for high-quality of content, display providers have come up with new technologies, such as 2K/4K/8K resolution, 60/120/240 frames rate, high dynamic range (HDR), and Adobe RGB/BT.2020, to present videos of various styles. Carrying out video enhancement under low quality video is a challenging problem.

A U.S. Pat. No. 7,746,382 assigned to Microsoft Corp describes an automated video enhancement system and method. The automated video enhancement method uses frame-to-frame motion estimation as the basis of the video enhancement. The automated video enhancement method includes generating global alignment transforms, generating optic flow vectors, and using these global alignment transforms and optic flow vectors to enhance the video. Although the patent described enhances the video by motion, estimation includes the computation of global motion and the computation of local motion. However, the approach is traditional for improving the video for locating the local motion within the video.

Another U.S. Pat. No. 7,262,818 assigned to Novatek Microelectronics Corp describes a video system for improving the response time and reducing the motion-blur of the panel display. Although the patent described embeds a frame buffer and a scaler for conducting format and resolution conversions for display panels of different sizes. The output of the scaler is sent to a de-motion-blur processor for reducing the blurriness due to the motion of image objects and the slow response time of flat panel display devices.

Yet another U.S. Pat. No. 7,548,659 assigned to Microsoft Corp discloses a video enhancement technique for improving visual experience of multiple image frames of a video sequence using a video completion technique. The missing image areas in the video sequence filled in using a video completion technique that involves motion in painting. Local motion data of a motion map from known image areas propagated into the missing image areas to produce an extended motion map. The patent uses traditional approach to obtain optical flow, which helps to locate the local motion within the video. Although, the system disclosed improves the quality of a video to some extent, but the system explained has limited flexibility.

Another U.S. Pat. No. 8,269,886 assigned to Synaptics Inc discloses a video system for improving the visual quality of low-resolution video displayed on large-screen displays. A video format converter may be used to process a low-resolution video signal from a media-providing device before the video is displayed. The video format converter may detect the true resolution of the video and DE interlaces the video signal accordingly. Although the patent described used for low-resolution videos that are also low in quality, the video format converter may reduce compression artifacts and apply techniques to enhance the appearance of the video. Video real resolution is detected to determine how to reduce compression artifacts and apply techniques to enhance the appearance of the video.

Yet another U.S. Pat. No. 10,523,955 assigned to Magic Pony Technology Ltd described a method for enhancing at least a section of lower-quality visual data. The visual data enhances a hierarchical algorithm is then selected from a plurality of hierarchical algorithms, wherein the step of selection is based on a predetermined metric and wherein the hierarchical algorithms were developed using a learned approach and at least one of the hierarchical algorithms is operable to increase the quality of the lower-quality visual data. The selected hierarchical algorithm is then used to increase the quality of the lower-quality visual data to create a higher-quality visual data. Although the patent involves a learned approach and at least one of hierarchical algorithms to only increase the video resolution.

Another prior art disclosed in a PCT Publication WO2012068008 assigned to Cisco Technology Inc. discloses a method for providing enhanced graphics in a video environment. The method described evaluates a plurality of pixels within the video input, and determines if a particular pixel among the pixels is associated with a colour that matches a designated value associated with a chroma-key to adjust the corresponding colour by a certain percentage.

Another PCT Publication WO2008011202 assigned to Qualcomm Inc discloses a devices and methods for processing multimedia data to generate enhanced multimedia data at a receiver based on encoder assisted pre-processing. Although the patent described processes multimedia data, which includes identifying at least a one-pixel intensity range. This method is able to modify dynamic range in pixel level.

The prior art described above only maintains a monotonous system that has limited flexibility and involves a restricted type of operations tasked to enhance videos of various genre. Although many applications disclosed above adopt deep learning model, which is a learned based approach, instead of conventional methods to achieve better performance on these demanding technologies. However, there is no video enhancing technology developed, which improves the quality of the videos intelligently. Additionally, existing system also does not properly consider user experience. In other words, there is not a single paradigm in video enhancement as each individual has his/her own personal preference for improving the video quality adaptively and flexibly.

Therefore, to overcome the shortcomings of the prior-arts, there is a need to provide a video enhancement system that intelligently and adaptively enhance the video using deep-learning algorithm. Additionally, it would be desirable to provide a video enhancement system that focus on analysing of a video sequence followed by processing of the video to enhance the quality of the video. Thus, there is a need to provide an intelligent video enhancement system (IVES) that provides better visual effects to a user based on video corresponding features and personal preferences.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need to provide an intelligent video enhancement system (IVES) that provides better visual effects to a user based on video corresponding features and personal preferences.

SUMMARY OF THE INVENTION

In accordance with the present invention, the disadvantages and limitations of the prior art are substantially avoided by providing an intelligent and adaptive video enhancing system for enhancing a video for improved user experience based on users preferences. The video enhancing system includes a dynamic analysis module and an adaptive processing module for analysing and processing the video respectively for enhancing the quality of the video.

The dynamic analysis module includes a scanner for scanning fundamental information related to the video. The scanner scans the video to generate a scanned video. Further, the dynamic analysis module includes a pair of extractors for extracting multiple features associated with the video. Further, the pair of extractors includes a low-level feature extractor and a high-level feature extractor. In addition, the low-level feature extractor extracts multiple inherent features. In addition, the high-level feature extractor extracts multiple unique features. Further, the dynamic analysis module includes a feature analysis module. The feature analysis unit analyzes the scanned video and the multiple features to develop a recommended workflow.

Furthermore, the video enhancement system includes the adaptive processing core module for triggering multiple operators in reference to the recommended workflow. The adaptive processing controller includes an operator pool for storing multiple operators. Further, the adaptive processing module includes a processing controller. The processing controller commands and controls an operator pool. In addition, the processing controller commands the operator pool for selecting the multiple operators and further triggers the multiple operators from the operator pool based on the recommended workflow. In addition, the dynamic analysis module and the adaptive processing unit module collectively enhance the video quality.

A primary objective of the present invention is to provide a video enhancement system for enhancing a video with better visual quality for improved user experience.

Another objective of the present invention is to provide a video enhancing system that is intelligent and self-learning.

Yet another objective of the present invention is to provide a flexible video enhancing system based on video corresponding features and personal preference.

Another objective of the present invention is to provide the video enhancing system that is flexible and intelligent system with Dynamic Analysis module (DAM) or Dynamic Analysis Model to recommend an enhancement workflow based on analysis of the original video and users' preference.

Yet another objective of the present invention is to provide the video enhancing system that proposes Adaptive Processing Core (APC) module that triggers appropriate operators for processing the video to enhance the quality of the video.

In one aspect of the present invention, the dynamic analysis module based on deep learning model that recommend an enhancement workflow based on analysis of the original video and users' preference. In one embodiment, the scanner scans video resolution, video compressing rate, video colour space and video bit depth.

In one another embodiment, the multiple inherent features extracted by the low-level feature extractor pixel intensity and global gradient. In yet another embodiment, the low-level feature extractor further measures pixel intensity and global gradient of the video. In one another embodiment, the multiple unique features are video content, video semantic, video scenario and video style extracted by the high-level feature extractor.

Further, the dynamic analysis module further includes a user preference unit. The user preference unit analyzes multiple preferences of a user. The user preference unit includes a feature analyzer and a feedback analyzer. The feature analyzer analyzes multiple features associated with the multiple preferences of the user. In addition, the user preference unit includes a feedback analyzer unit. The feedback analyzer unit analyzes a feedback provided by the user. Further, the dynamic analysis module includes a feature analysis module. The feature analysis unit analyzes the scanned video, the inherent features, the unique features and the multiple preferences of the user to develop a recommended workflow with respect to the original video.

In preferred embodiment of the present invention, the multiple user preferences are mood of the user, liking of the user, disliking of the user. In one embodiment of the present invention, the dynamic analysis module unit receives a user feedback periodically. In one another embodiment of the present invention, the user feedback tends the intelligent video enhancing system to improve multiple functionalities of the video enhancing system.

In another aspect of the present invention, the adaptive processing core module works on basis of deep learning model, which triggers appropriate operators, provides each with corresponding parameters, communicates between all processing units, and enables them work cooperatively to outperform a simple collection of these processing units. In one embodiment, the multiple operators are super resolution, video de-noise, high dynamic range, de-flicker, slow motion, colour enhancement.

In one embodiment, the adaptive processing module further includes an operator pool that includes multiple operators based on the multiple preferences of the user. In one another embodiment, the adaptive processing module further includes a plurality of controllers to control the operator pool.

In one another embodiment, the adaptive processing module triggers multiple operators from the operator pool based on the recommended work-flow. In addition, the dynamic analysis module and the adaptive processing module enhance the video intelligently and flexibly based on multiple user preferences.

In one yet another embodiment of the present invention, the adaptive processing module works on basis of deep learning model, which triggers appropriate operators, provides each with corresponding parameters, communicates between all processing units, and enables them work cooperatively to outperform a simple collection of these processing units. In one embodiment, the multiple operators are super resolution, video de-noise, high dynamic range, deflicker, slow motion, colour enhancement.

In one another embodiment, the adaptive processing module further includes an operator pool that includes multiple operators based on the multiple preferences of the user. The adaptive processing controller includes an operator pool for storing multiple operators. Further, the adaptive processing module includes a processing controller. The processing controller controls an operator pool. In addition, the processing controller commands the operator pool for selecting the multiple operators and further triggers the multiple operators from the operator pool based on the recommended workflow. In addition, the dynamic analysis module and the adaptive processing unit module collectively enhance the video quality. In addition, the dynamic analysis module and the adaptive processing module enhance the video intelligently and flexibly based on multiple user preferences.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE DRAWINGS

The present invention discloses a flexible, self-learning and an intelligent video enhancing system based on video corresponding features and personal preference with better visual quality for improved user experience. The video enhancing system includes a dynamic analysis module and an adaptive processing module for analysing and processing the video respectively.

The dynamic analysis module includes a scanner for scanning the video to generate a scanned video. Further, the dynamic analysis module includes a pair of extractors for extracting multiple features associated with the video. Further, the dynamic analysis module includes a feature analysis module. The feature analysis unit analyzes the scanned video and the multiple features to develop a recommended workflow.

Further, the video enhancement system includes an adaptive processing module for triggering multiple operators in reference to the recommended workflow. The adaptive processing core module includes an operator pool for storing multiple operators. Further, the adaptive processing module includes a processing controller. The processing controller controls an operator pool. The processing controller commands the operator pool to select multiple operators and then the processing controller triggers the selected operator in accordance with the recommended workflow generated by the dynamic analysis module to enhance the video.

Figure 1A:
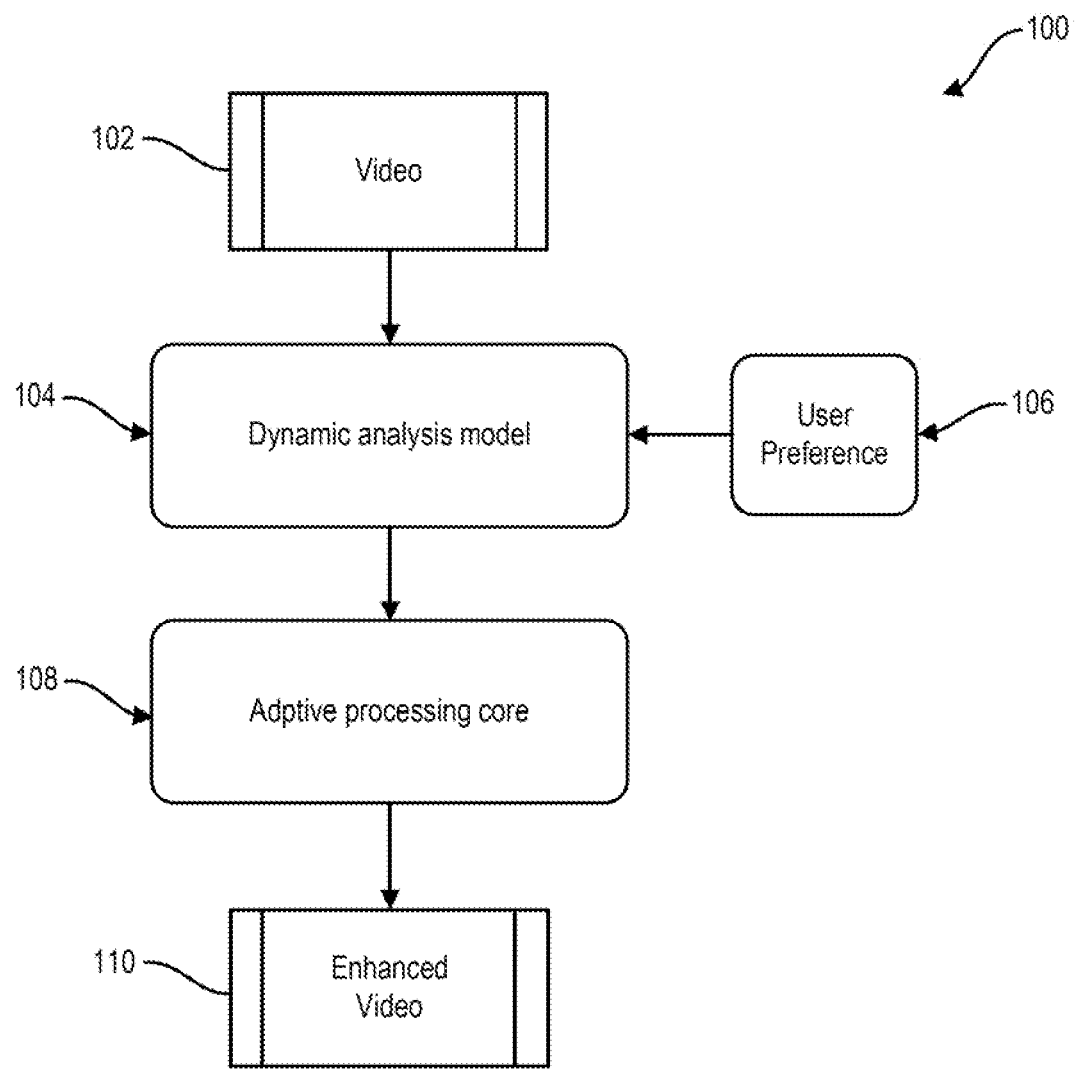
FIG. 1(A) illustrates an intelligent video enhancement system (IVES) based on a user preferences in accordance with the present invention.
Figure 1B:
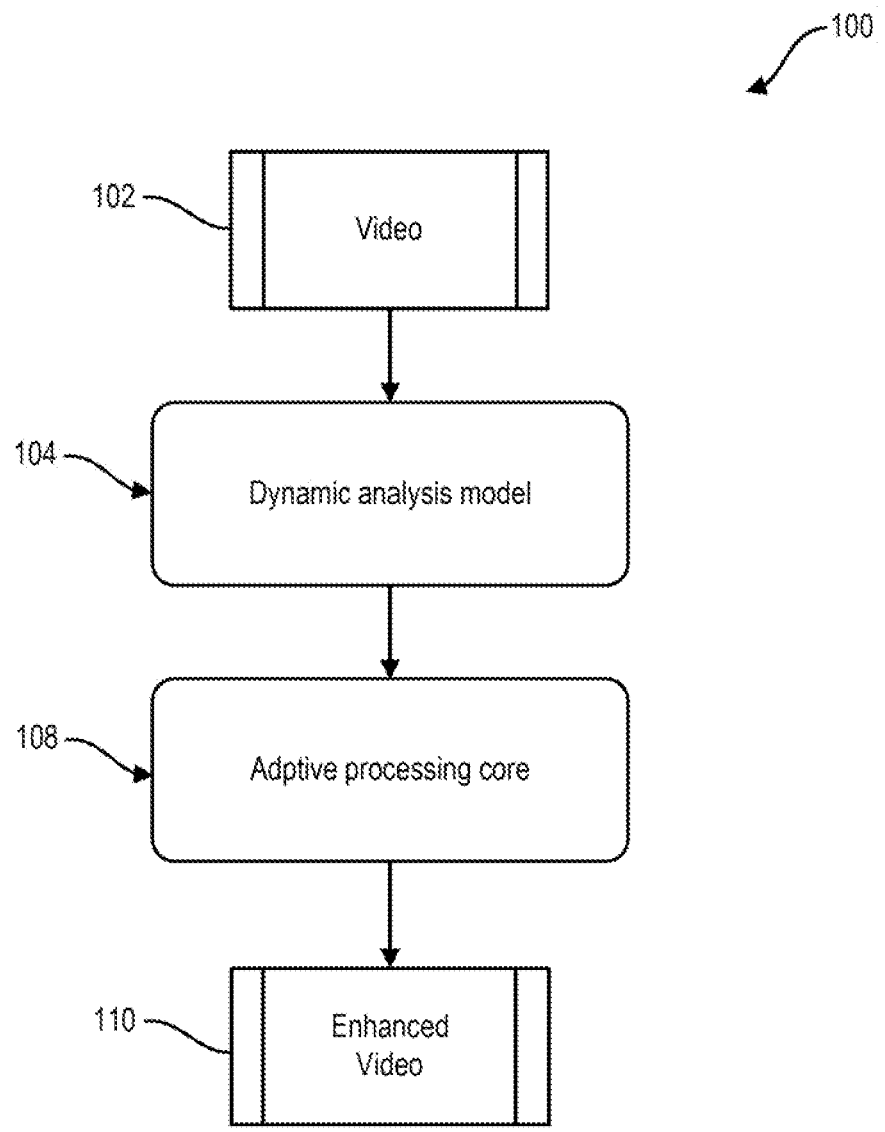
FIG. 1(B) illustrates an intelligent video enhancement system (IVES) in accordance with the present invention.

FIG. 1 (A) illustrates a framework of a video enhancing system (100) for enhancing the video (102) for improved user experience. The video enhancing system (100) is a part of whole video system, indicating that it does not involve any video capture, recording, encoding-decoding, display, transportation, etc., and only concerns with video enhancement. To start the workflow, a video signal or command first provided or inputted to the video enhancing system (100).

The video enhancing system (100) includes a dynamic analysis module (104) to recommend an enhancement workflow based on analysis of the original video and users' preference. The video (102) firstly goes through the dynamic analysis module (104). The dynamic analysis module (104) analysis runs analysis of the video dynamically to recommend a workflow upon which further processing of the video (102). The dynamic analysis module (104) involves scanning of video fundamental information, low-level feature extraction, high-level feature extraction, etc.

The video enhancing system (100) further includes a user preference (106) providing unit to analyze multiple preferences of a user with respect to the video. The user preference (106) is taken in account to improve user experience. The dynamic analysis module (104) analyses the video (102) with respect to the user preferences (106) to provide a recommended workflow. To determine the target video quality and amount of enhancement, the dynamic analysis module (104) needs to send information to an Adaptive Processing Core (APC) after completing the corresponding analysis.

The video enhancing system (100) further includes an adaptive processing core module (108) for triggering multiple operators in reference to the recommended work-flow.

The adaptive processing module (108) includes an operator pool for storing multiple operators in correspondence to the video enhancement.

Further, the adaptive processing module (108) includes a processing controller. The processing controller controls the operator pool. In addition, the processing controller commands the operator pool for selecting the multiple operators and further triggers the multiple operators from the operator pool based on the recommended workflow. In addition, the dynamic analysis module (104) and the adaptive processing module (108) collectively enhance the video quality. The dynamic analysis module (104) and the adaptive processing module (108) collectively enhance the video (102) based on users preferences (106). Finally, the enhanced video (110) outputted to next step, such as video display, storage, processing system, etc.

FIG. 1 (B) illustrates a framework of a video enhancing system (100) for enhancing the video (102) for improved user experience. The video enhancing system (100) includes a dynamic analysis module (104) to recommend an enhancement workflow based on analysis of the original video and users' preference. The video (102) firstly goes through the dynamic analysis module (104). The dynamic analysis module (104) analysis runs analysis of the video dynamically to recommend a workflow upon which further processing of the video (102). The dynamic analysis module (104) involves scanning of video fundamental information, low-level feature extraction, high-level feature extraction, etc.

The video enhancing system (100) further includes an adaptive processing core module (108) for triggering multiple operators in reference to the recommended work-flow. The adaptive processing module (108) includes an operator pool for storing multiple operators in correspondence to the video enhancement. Further, the adaptive processing module (108) includes a processing controller. The processing controller controls the operator pool. In addition, the processing controller commands the operator pool for selecting the multiple operators and further triggers the multiple operators from the operator pool based on the recommended workflow. In addition, the dynamic analysis module (104) and the adaptive processing module (108) collectively enhance the video quality.

The dynamic analysis module (104) and the adaptive processing module (108) collectively enhance the video (102). Finally, the enhanced video (110) outputted to next step, such as video display, storage, processing system, etc.

Figure 2:
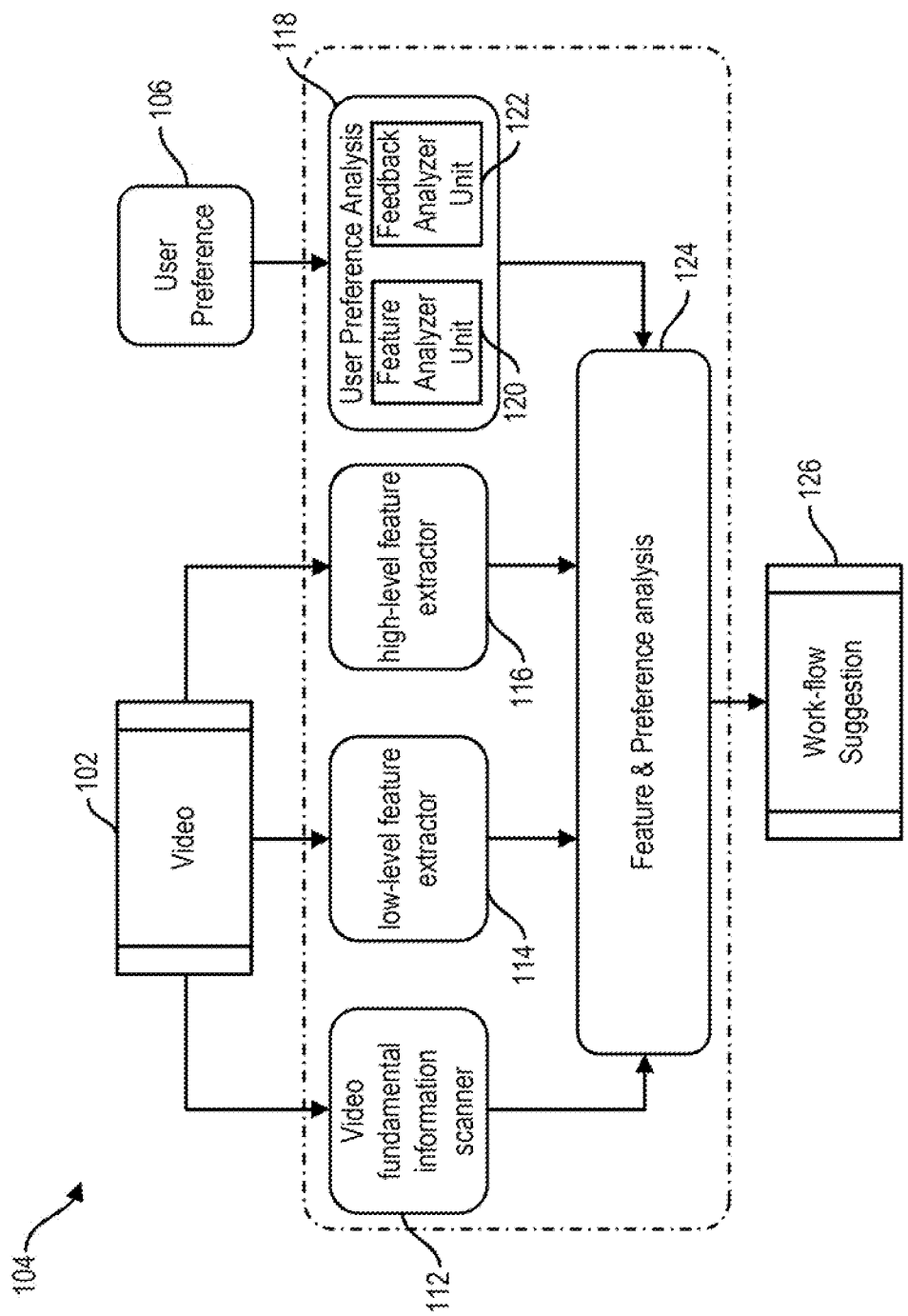
FIG. 2 illustrates a dynamic analysis module (DAM) in accordance with the present invention.

FIG. 2 illustrates recommended dynamic analysis module (104) framework including flow of the video (102) through different sub-blocks or components along with user's preference to generate a recommended workflow. The main purpose of this dynamic analysis module (104) is video analysis in which huge video information extracted before being processed. The dynamic analysis module (104) includes several sub-blocks to analyze not only concrete but also abstract features.

The dynamic analysis module (104) includes a scanner (112) for scanning a video (102). The scanner (112) scans the video (102) for scanning fundamental information with respect to the video (102). The fundamental information includes video resolution, video compression rate, video color space, video bit depth and other features. In one example, for videos compressed by H.264, H.265, MPEG, etc., much data could usually be extracted from their compression information. This includes video resolution, video compression rate, video color space, video bit depth, etc., which could be organized into a table for the joint inference later.

The dynamic analysis module (104) further includes a pair of extractor (114, 116) for extracting features from the video (102). The dynamic analysis module (104) includes a low-level feature extractor (114) for extracting multiple inherent features of the video (102). The low-level feature extractor (114) measures the multiple inherent features firstly and performs operation to extract features from the video (102).

In one embodiment, the low-level feature extractor (114) selects some low frequency patches from the video frames to calculate variance of pixel intensity, which is a reference noise level useful for the de-noising operation. Additionally, a resolution level of the video (102) evaluated by calculating the global gradient as resolution does not only refer to its size but also actual manifested resolution.

All in all, by referring to various objective and subjective evaluation matrices such as PSNR, SSIM, VMAF and VDP, the low-level feature extractor (114) figures out the actual enhancement operation required by each video in more comprehensive way.

The dynamic analysis module (104) includes a high-level feature extractor (116) for extracting unique features of the video (102). The unique features include content, semantic, scenario, style, and alike of the video (102). Unlike the inherent features, these unique features are indescribable and unquantifiable. The high-level feature extractor (116) efficient to be extracted by adopting deep learning model as it is known that deep-learning network pays attention to object abstract features. Network could recognize or localize corresponding content in sequence. Furthermore, if a temporal model equipped to expand analysis on time dimension, the moving object would be recognized and predicted. With this abstract information, the specific content in video can be reasonably enhanced.

The dynamic analysis module (104) includes a user preferences analysis unit (118) to analyze multiple preferences of a user. The user preference unit (118) includes a feature analyzer (120) to analyze multiple features associated with the multiple preferences of the user. The user preference unit (118) further includes a feedback analyzer unit (122) to analyze a feedback provided by the user. In an example, a recommended approach conducted to a quick video performance survey. For instance, at the end of each video, a few randomly selected clips could be displayed and graded by the users in several aspects such as aesthetic, resolution, comfort ability, view definition, etc. These subjective quality evaluations can be structured for DAM analysis, similar to other extracted features.

Further, the dynamic analysis module includes a feature analysis module (124). The feature analysis unit (124) analyzes the scanned video, the multiple features, and the multiple preferences of the user to develop a recommended workflow (126) with respect to the original video (102). In preferred embodiment of the present invention, the multiple user preferences are mood of the user, liking of the user, disliking of the user.

In preferred embodiment of the present invention, the dynamic analysis module (104) unit receives a user feedback periodically. In preferred embodiment of the present invention, the user feedback tends the intelligent video enhancing system (100) to improve multiple functionalities of the intelligent video enhancing system (100). The purpose of gathering features using the respective sub-units described above is to help understand the video and recommend the best recommended workflow to APC (108).

The feature analysis module (124) analyses the unstructured data, such as high-level features, and structured data, such as fundamental information of the video, low-level features and user preference encoded by the convolution neural networks (CNN) respective sub-units would be further processed. All encoded information further embedded and passed through a classifier, which further followed by identification of the best workflow to use in improving the video quality.

In one alternative embodiment of the present invention, a network with two VGG-style convolution neural networks (CNN) branches are to be set up, one branch for extracting video sequence features while the other for extracting synchronous audio features. Features resulting from the two branches are concatenated and passed through the fully connected layers to analyze video scenes representation, such as video captioning also adopts a deep-learning network to extract video and audio features for video scene recognition task.

Before the fully connected layer, it uses clustering methods to refine features and boost feature embedding and classification. In one embodiment, 3D-CNN concatenates short-term features and the long-term feature bank to attention blocks in order to analyze video scene features comprehensively to reveal short-term relationship between features, considers long-term relationship through a long-term feature bank. Eventually, to provide APC (108) with a recommended workflow (126), the DAM (104) incorporates these features and reveals their implied relationship using a deep learning model, efficiently trained with a well-designed target.

Figure 3:
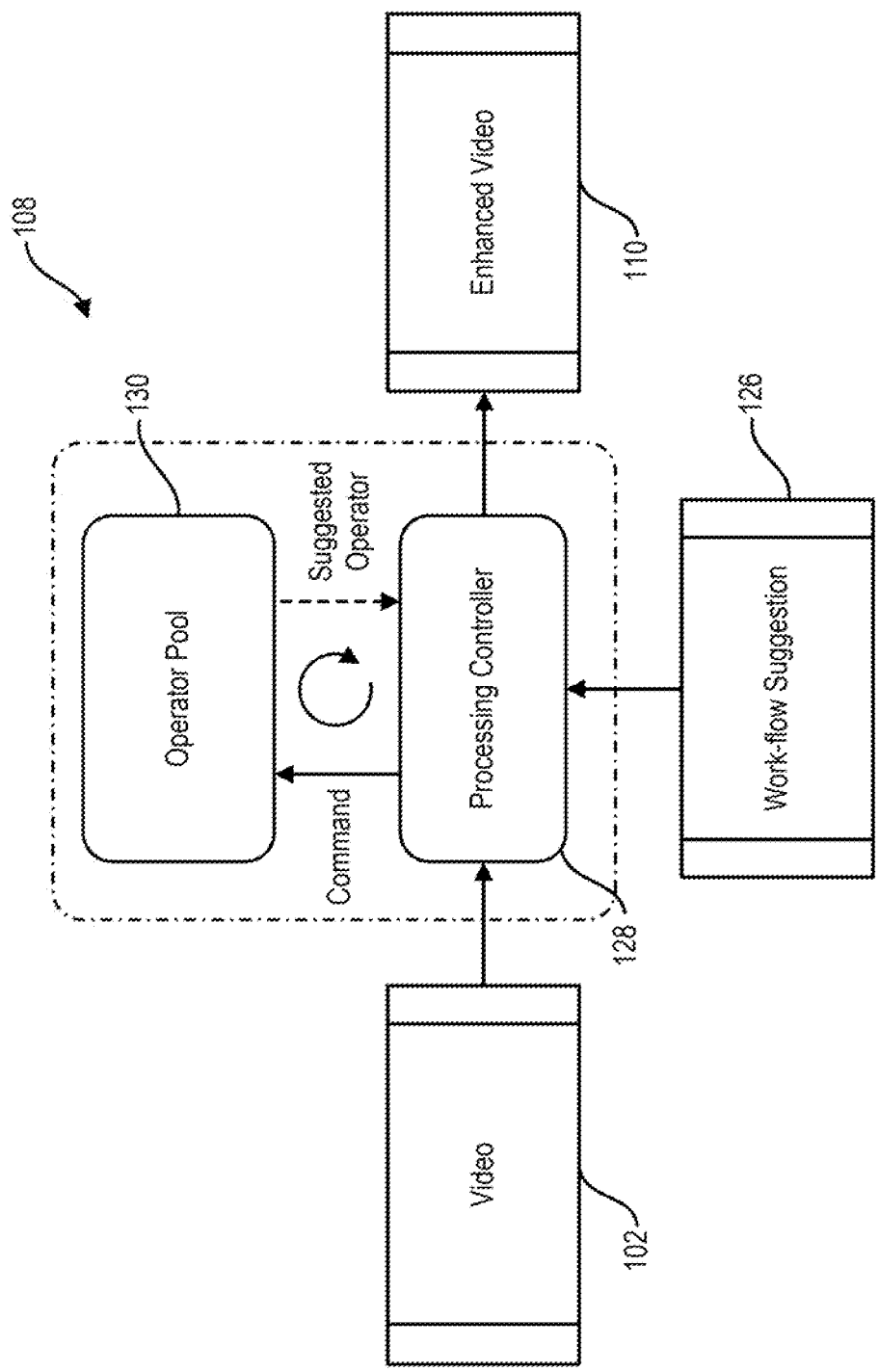
FIG. 3 illustrates an adaptive processing core (APC) module in accordance with the present invention.

FIG. 3 illustrates an adaptive processing module (108) for processing the video (102) based on recommended workflow (126) generated through the dynamic analysis module (104) for producing the enhanced video (112). The adaptive processing module (108) works on basis of deep learning model, which triggers appropriate operators as DAM (104) required, provides each with corresponding parameters, communicates between all processing units, and enables them work cooperatively to outperform a simple collection of these processing units. The adaptive processing module (108) run the selected operator with specific parameters, cache intermediate data on which next activated operator makes progress, etc.

The adaptive processing module (108) includes a processing controller (128) for activating and controlling specific operators from an operator pool (130) for video enhancement. The operator pool (130) includes multiple operators based on the user's preferences and the features related to the video (102). The adaptive processing module (108) enhances the video intelligently and flexibly based on multiple user preferences. The operator pools (130) includes the multiple operators based on deep learning model such as but not limited to super resolution, video de-noise, high dynamic range, de-flicker, slow motion, colour enhancement explained below in detail.

In one example, the operator named as super resolution from the operator pool for enhancing resolution of the video is discussed. In one embodiment of the present invention, the recommended network explained may contain many popular blocks to consider varied situations of video. If inherent pattern needs to be reconstructed by stacking the residual block or by back-projection, the deep learning model within the APC (108) model would be a good choice to achieve large receptive field.

Further, adding residual to the network, makes the network focus on high-frequency area to avoid local minima, whereas optical flow model and pyramid structure can relieve motion ghost and help sub-pixel registration. Meanwhile, using deformable convolutional network instead of traditional convolution network within the APC (108) overcome the shortcoming of the latter, i.e. unable to process deformable object and features.

Secondly, the operator named as video de-noising from the operator pool for enhancing the video by removing unwanted noises discussed. Generally, the noise model estimated by DAM (104) used as a factor that adaptively controls de-noise effect with a deep-learning network. U-Net based network has been proved useful for de-noising at most times. The two approaches suitable for de-noising the video, firstly we can reduce noise directly or by using, predict pixel-wise noise kernel.

Further, a high dynamic range (HDR) operator of the video from the operator pool (130) for improving visual experience discussed. Normally, a high dynamic range video gives a better visual experience. The video dynamic range enhanced at corresponding area using the abstract feature model. Based on a reasonable pyramid network, the diverse frequency information takes into account for not only overexposure but also underexposure. The network also learns non-linear transformation such as tone-mapping curve.

Further, the operator known as De-flicker associated with the video (102) need to be considered for improving or enhancing the video (102). Video flickering harms user experience, especially in extreme motion scenes such as those in action movies. To reduce this effect, a temporal model used within the APC (108) to improve the video quality by reducing the de-flickering. A 3D convolution network or recurrent network also used for this purpose.

Further, the operator known as slow motion associated with the video (102) used for improving or enhancing the video (102). The method used for improving motion within the video (102) is to develop a depth-aware flow projection layer to synthesize intermediate flows that preferably sample closer objects than further ones. In other words, the learned intermediate flow maps help deep learning network to interpolate frames properly. Alternately, a one-stage space-time video super resolution framework approach can be used approach used a one-stage space-time video super resolution framework, which directly synthesizes an HR slow-motion video from a low frame rate.

Further, the operator know color enhancement used for enhancing color experience of the video. In an example, for applying color restoration on old movies in addition to normal color enhancement, an approach used, which uses real old images and synthetic color degraded images as inputs to train the first encoder such that it maps them to the latent space for corrupted images. Further, the second encoder within the APC (108) works on synthetic old clean images and maps them to another latent space for clean images. The CNN network would then learn the mapping between the two latent spaces through adversarial learning. Finally, the APC (108) uses the mapping to recover the color of the real old image.

Figure 4:
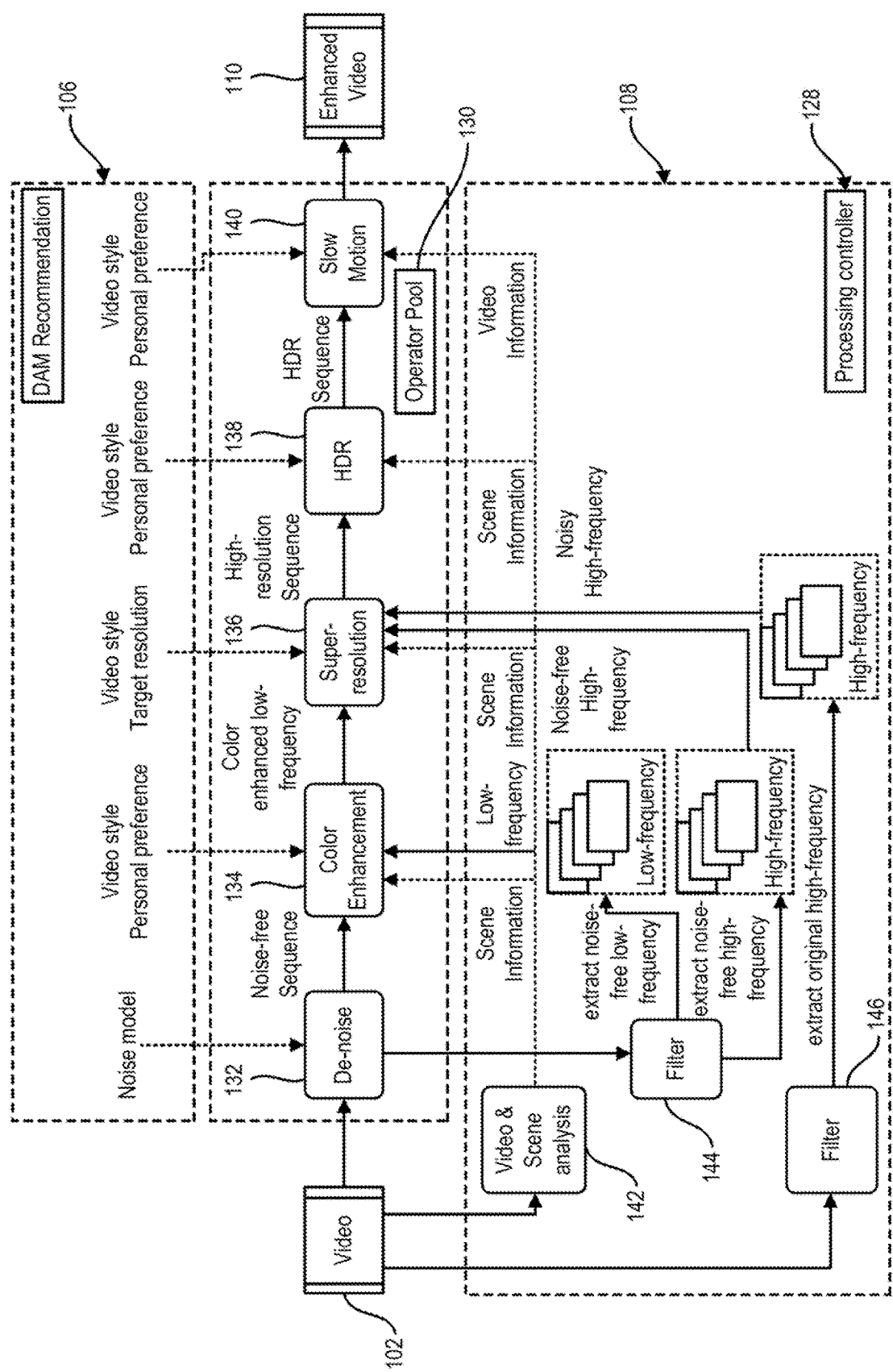
FIG. 4 illustrates a workflow diagram of the adaptive processing core (APC) module in accordance with the present invention.

FIG. 4 illustrates an example of working of APC (108) based on recommended workflow (126). After dynamic analysis module (104) analyzes a specific video (102) source, it will send an instruction which involves de-noise, colour enhancement, super resolution, and HDR in form of recommended workflow (126).

The Slow-motion operator (140) is an optional processing, as it based on personal preference, the user only wants to increase the frame rate at certain scenes. As soon as APC (108) receives the instruction, the processing controller (128) inside APC (108) triggered. In this case, the processing controller (128) will first activate the de-noise operator (132), which requires the noise model information identified earlier by DAM (104) to reduce noise properly. The noise-free sequence separated into low-frequency portion and high-frequency portion by a filter such as bilateral filter.

Based on the video style and personal preference information obtained from DAM (104) analysis results, the adaptive colour enhancement operator (134) will enhance the low frequency portion of the noise-free sequence accordingly. Meanwhile, the processing controller (128) uses the filter from the previous step to extract high frequency portions from the original noisy video. Thus far, there are three sequences the colour enhanced sequence with low-frequency information, the noise-free sequence with high-frequency information and the noisy sequence with high-frequency information from the original video.

All three sequences will be concatenated and sent to a super-resolution operator (136) because the super resolution model is trained to have the ability to refer the noise-free sequence and filter only useful information from the original high-frequency portion to reconstruction the resolution. The super resolution operator (136) needs both target resolution factor and the video style information to select the proper deep learning model.

Following the super resolution operator, HDR operator (138) takes into account the video style and personal preference to give the sequence a high dynamic range so that the scene becomes more visually pleasing.

Lastly, with the enhanced video, the processing controller (128) at the end of recommended workflow (126) will activate the slow-motion operator (140). Based on the reasons mentioned above, this slow-motion operator (140) would also require the video style and personal preference information from dynamic analysis module (DAM) (104).

Figure 5:
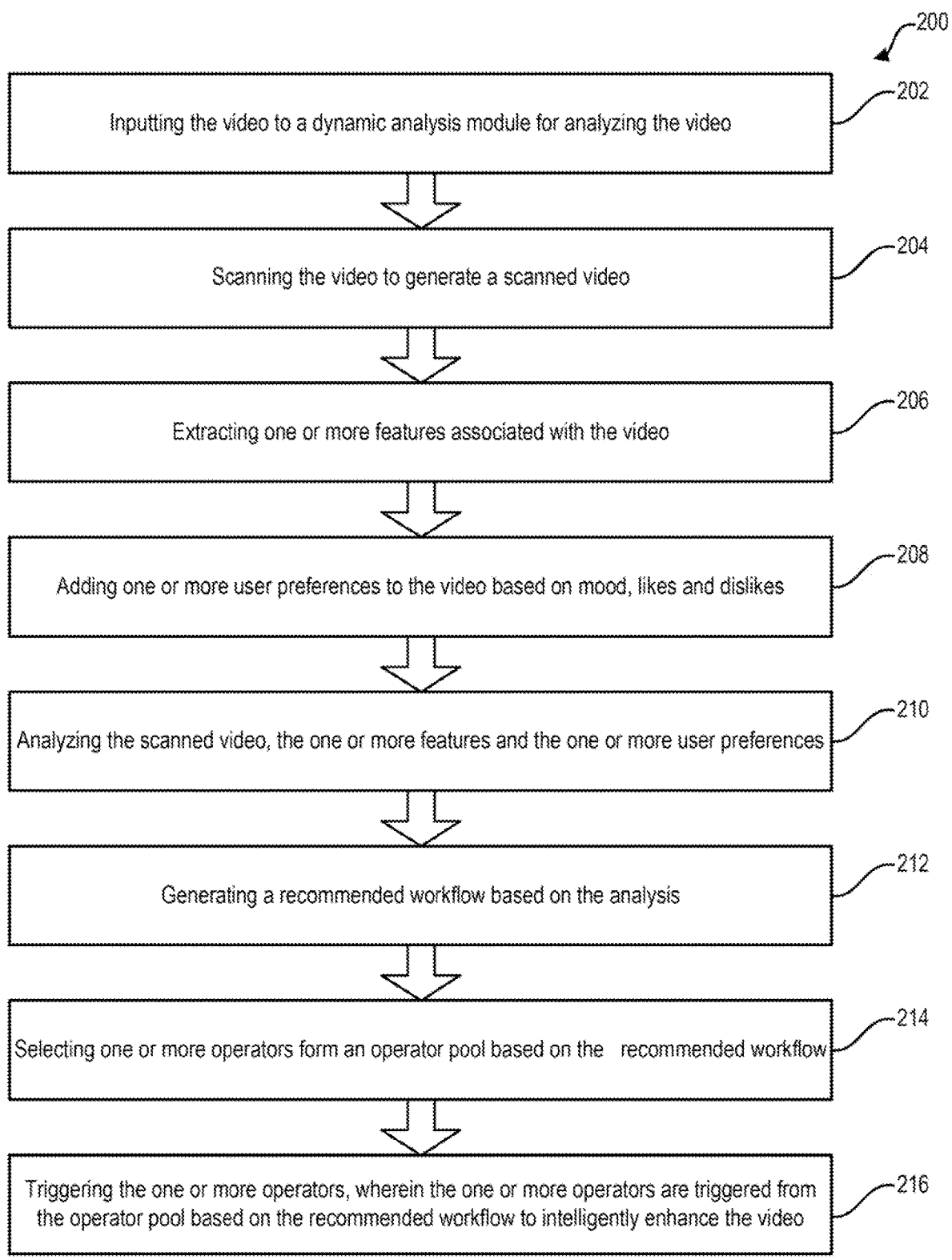
FIG. 5 illustrates a method of enhancing quality of a video intelligently in accordance with the present invention.

FIG. 5 illustrates a method (200) for enhancing a video (102) based on a user's preference and features to be enhanced or improved for providing better video experience of the video. At step 202, firstly, the original video (102) inputted to a video enhancing system (100). The video (102) inputted to a dynamic analysis module (104) of the IVES (100).

At step 204, the video (102) scanned by a scanner (112) of the dynamic analysis module (104). The fundamental information associated with the video (102) scanned by the scanner (112) to produce a scanned video.

At step 206, the pair of extractor (114, 116) extracts multiple inherent features and the features associated with the video (102). The low-level feature extractor (114) measures the multiple inherent features firstly and performs operation to extract features from the video (102).

The low-level feature extractor (114) selects some low frequency patches from the video frames to calculate variance of pixel intensity, which is a reference noise level useful for the de-noising operation. The high-level feature extractor (116) extracts unique features of the video (102). The unique features include content, semantic, scenario, style, and alike of the video (102).

At step 208, a user preferences analysis unit (118) adds multiple preferences of a user associated with the video (102). The user preference unit (118) includes a feature analyzer (120) to analyze multiple features associated with the multiple preferences of the user. The user preference unit (118) further includes a feedback analyzer unit (122) to periodically analyze a feedback provided by the user.

Further, at step 210, the feature analysis unit (124) analyzes the scanned video and the multiple features and the multiple preferences of the user to develop a recommended workflow (126) with respect to the original video (102).

Further, at step 212, a recommended workflow generated based on analysis of the DAM (104).

Further, at step 214, selecting one or more operators form an operator pool (130) based on the recommended workflow by the processing controller (128) of the adaptive processing module (108), the adaptive processing module (108) on basis of deep learning model, which triggers appropriate operators as DAM (104) required, provides each with corresponding parameters, communicates between all processing units, and enables them work cooperatively to outperform a simple collection of these processing units. The adaptive processing module (108) run the selected operator with specific parameters, cache intermediate data on which next activated operator makes progress, etc.

At step 216, triggering the multiple operators associated with the recommended workflow (126) to intelligently enhance the video. The enhanced video outputted to video playing devices such as video display, storage, processing system, etc. According to the user's satisfaction with the resulting enhanced video, their feedback sent back to DAM (104) for the use of the next personal preference analysis.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

The invention claimed is:

1. A video enhancing system for enhancing a video, wherein the video enhancing system comprising:
   a dynamic analysis module, wherein the dynamic analysis module includes:
   a scanner for scanning the video to generate a scanned video;
   a pair of extractors for extracting one or more features associated with the video, wherein the pair of extractors include:
   a low-level feature extractor for extracting one or more inherent features; and
   a high-level feature extractor for extracting one or more unique features; and
   a feature analysis unit for analyzing the scanned video and the one or more features to generates a recommended work-flow; and an adaptive processing core module for processing the video with reference to the recommended work-flow, wherein the adaptive processing core module includes:
an operator pool for storing one or more operators; and
a processing controller for providing commands to the operator pool for selecting followed by triggering the one or more operators from the operator pool based on the recommended work-flow, wherein the dynamic analysis module and the adaptive processing core module collectively enhances the video.

2. The video enhancing system in accordance with claim 1, wherein the dynamic analysis module is based on deep learning model.

3. The video enhancing system in accordance with claim 1, wherein the scanner scans compression information comprising resolution, compressing rate, color space and bit depth of the video.

4. The video enhancing system in accordance with claim 1, wherein the one or more inherent features include a pixel intensity and a global gradient of the video.

5. The video enhancing system in accordance with claim 4, wherein the low-level feature extractor further measures and extracts the pixel intensity and the global gradient of the video.

6. The video enhancing system in accordance with claim 1, wherein the one or more unique features include content, semantic, scenario and style of the video.

7. The video enhancing system in accordance with claim 1, wherein the adaptive processing core module is based on deep learning model.

8. The video enhancing system in accordance with claim 1, wherein the one or more operators based on a deep learning model include super resolution, video de-noise, high dynamic range, de-flicker, slow motion and color enhancement.

9. An intelligent video enhancing system for enhancing a video, wherein the intelligent video enhancing system comprising:
a dynamic analysis module wherein the dynamic analysis module includes:
a scanner for scanning the video to generate a scanned video;
a pair of extractors for extracting one or more features associated with the video, wherein the pair of extractors include:
a low-level feature extractor for extracting one or more inherent features; and
a high-level feature extractor for extracting one or more unique features;
a user preference unit for analyzing one or more preferences of a user,
wherein the user preference unit include:
a feature analyzer for analyzing one or more features associated with the one or more preferences of the user; and
a feedback analyzer for analyzing a feedback provided by the user; and
a feature analysis unit for analyzing the scanned video, the one or more features and the one or more preferences of the user to generates a recommended work-flow; and
an adaptive processing core module for processing the video in reference to the recommended work-flow, wherein the adaptive processing core module includes:
an operator pool for storing one or more operators; and
a processing controller for providing commands to the operator pool for selecting followed! by triggering the one or more operators from the operator pool based on the recommended work-flow, wherein the dynamic analysis module and the adaptive processing core module collectively enhance the video intelligently based on the one or more user preferences.

10. The intelligent video enhancing system in accordance with claim 9, wherein the one or more user preferences are based on moods, likes, dislikes of the user.

11. The intelligent video enhancing system in accordance with claim 9, wherein the dynamic analysis module receives the feedback periodically for improving efficiency.

12. The video enhancing system in accordance with claim 1, wherein the one or more feature extractors further perform de-noising operation.

13. A method for enhancing a video intelligently, wherein the method comprising:
inputting the video to a dynamic analysis module for analyzing the video;
scanning the video to generate a scanned video;
extracting one or more features associated with the video;
adding one or more user preferences to the video based on mood, likes and dislikes;
analyzing the scanned video, the one or more features and the one or more user preferences;
generating a recommended workflow based on the analysis;
selecting one or more operators form an operator pool based on the recommended workflow; and
triggering the one or more operators, wherein the one or more operators are triggered from the operator pool based on the recommended workflow to intelligently enhance the video.

14. A computer program product stored on a non-transitory computer-readable medium comprising a computer useable medium having computer program logic for enabling at least one processor in a computer system for enhancing a video intelligently via a software platform, said computer program logic comprising:
inputting the video to a dynamic analysis module for analyzing the video;
scanning the video to generate a scanned video;
extracting one or more features associated with the video;
adding one or more user preferences to the video based on mood, likes and dislikes;
analyzing the scanned video, the one or more features and the one or more user preferences;
generating a recommended workflow based on the analysis;
selecting one or more operators form an operator pool based! on the recommended workflow; and
triggering the one or more operators, wherein the one or more operators are triggered from the operator pool based on the recommended workflow to intelligently enhance the video.

* * * * *